Sept. 22, 1953  T. A. FEENEY  2,652,994
MOTION RATIO CHANGER
Filed Aug. 30, 1948  3 Sheets-Sheet 1
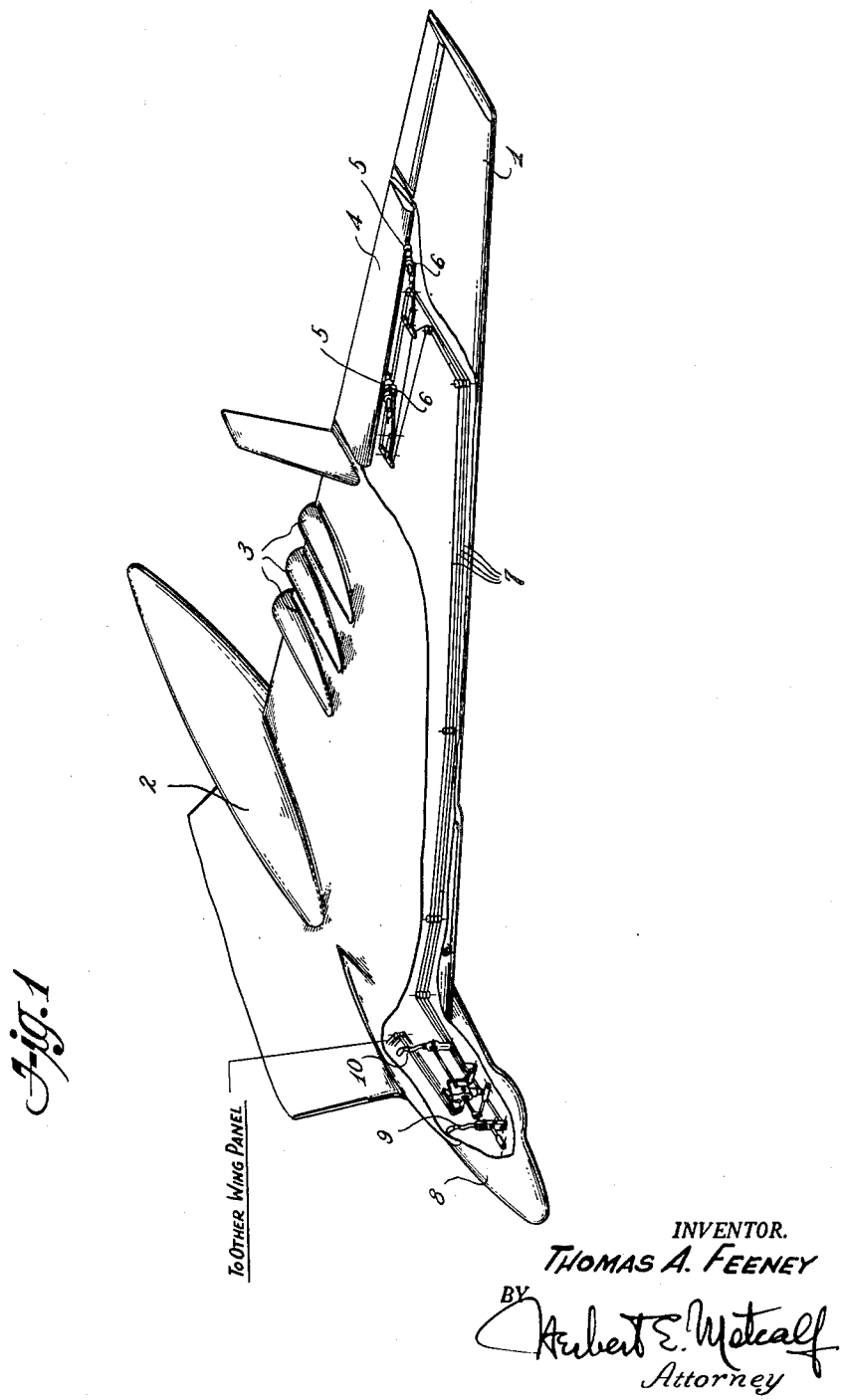
INVENTOR.
THOMAS A. FEENEY
BY Hubert E. Metcalf
Attorney

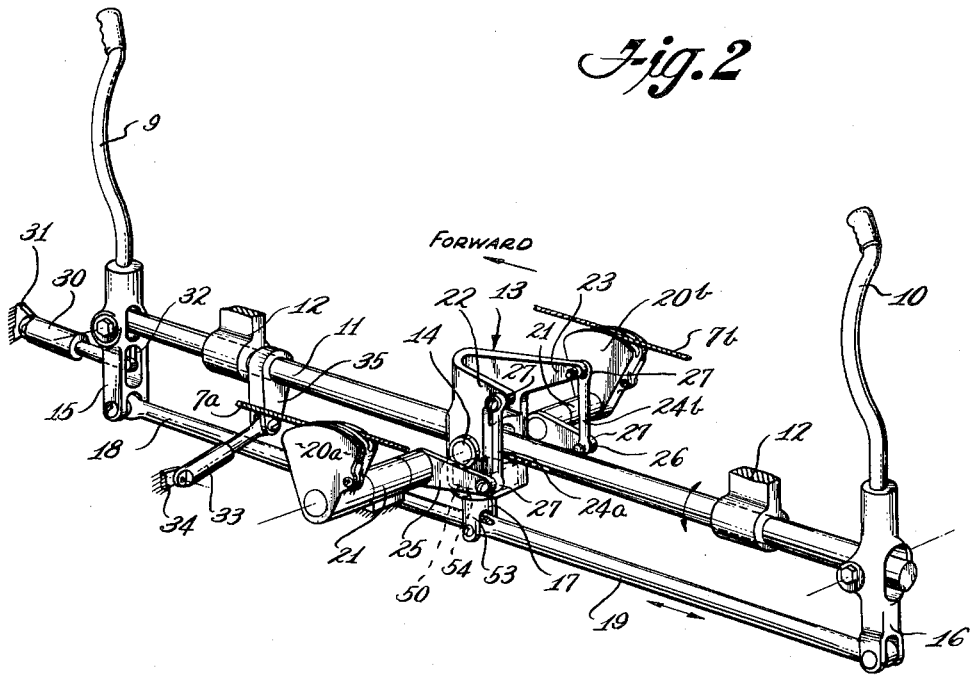
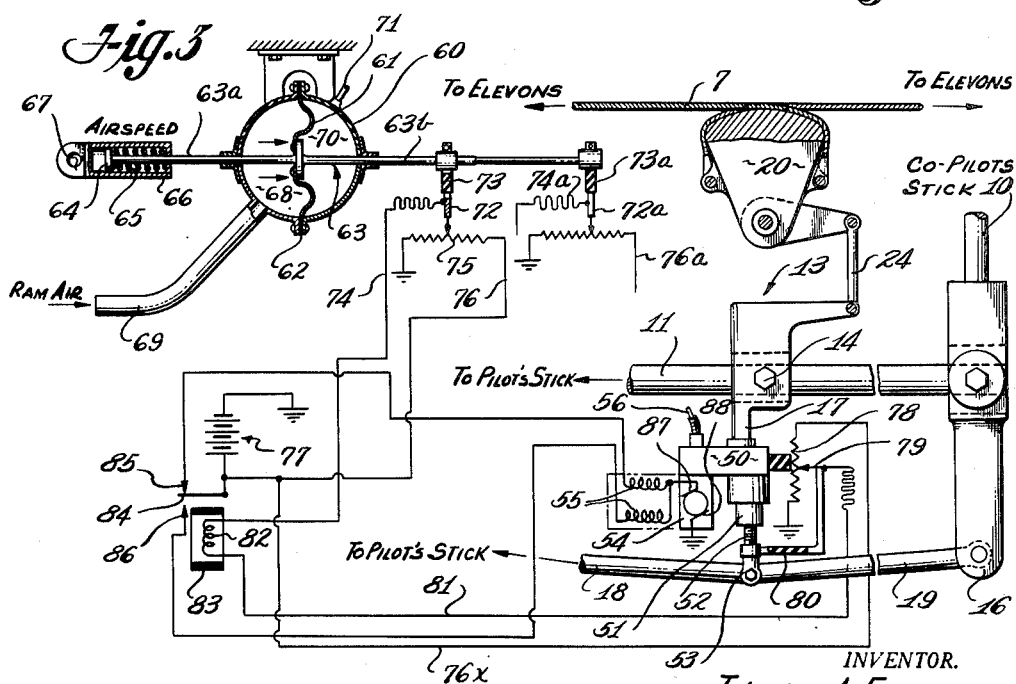

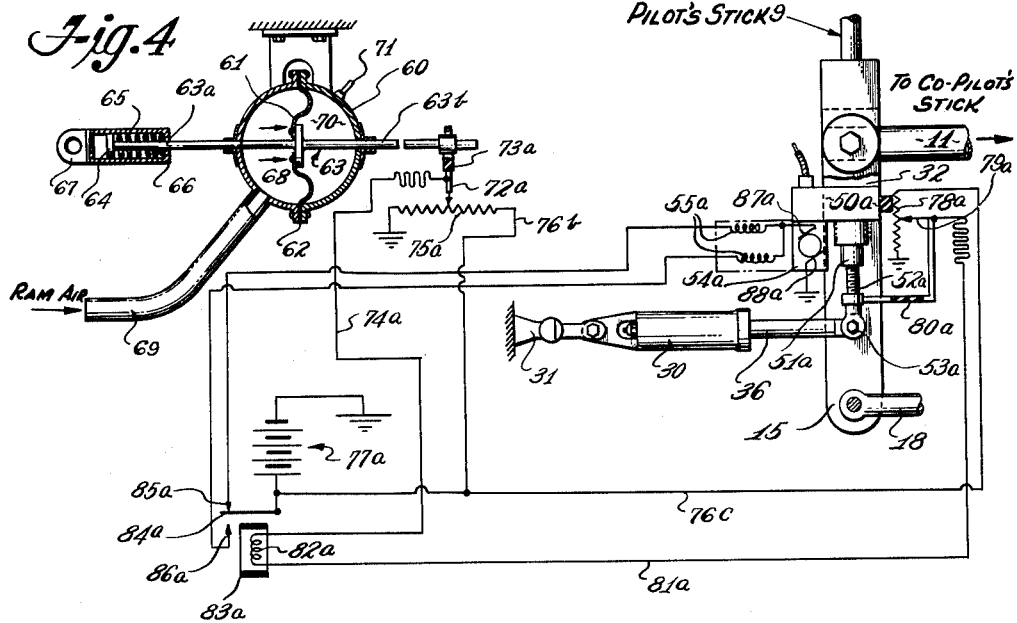

Patented Sept. 22, 1953

2,652,994

UNITED STATES PATENT OFFICE 2,652,994

MOTION RATIO CHANGER

Thomas A. Feeney, Los Angeles, Calif., assignor to Northrop Aircraft, Inc., Hawthorne, Calif., a corporation of California Application August 30, 1948, Serial No. 46,877

3 Claims. (Cl. 244—83)

My invention relates to aircraft control systems and, more particularly, to a full powered attitude control system for high speed airplanes.

In an airplane equipped with a conventional attitude control system, a pilot's column or stick is connected to move the elevators and aileron surfaces which are so attached to the airplane as to control the airplane in pitch or climb, and in roll, respectively. Directional control is usually provided by the pilot's use of rudder pedals connected to rudder surfaces.

The pilot's stick, which will be considered herein as being the full equivalent of the conventional control column and wheel; and the rudder pedals, are connected to the proper control surfaces in such a manner that the ratio of stick motion to control surface motion is a fixed value.

The elevator surfaces, in most airplanes, require a large travel or swing in order to provide satisfactory landing control characteristics at landing speeds. In modern high speed airplanes, the ratio of top speed to landing speed is so great that a very small displacement of the elevator surfaces at high airplane speeds will produce a large aerodynamic response. The airplane that has the proper control surface travel at low speeds tends to become over-sensitive to elevator control at high speeds, as small displacements of the elevator producing large airplane responses, correspond to extremely small control stick motions when the airplane is flying at a high speed.

In airplanes that are provided with control surfaces moved entirely by auxiliary power, such as by an electric or hydraulic motor, under the control of signals corresponding to movements of the pilot's stick, no feed-back of the air load on the control surface is present on the control stick. In consequence, the pilot can easily and unwittingly apply excessive load factors on the airplane at high speed, due to excessive movement of the control surfaces by the pilot at high speeds.

It is an object of the present invention to provide a means and method of preventing the pilot from overloading an elevator surface under full power operation of the surface by the pilot.

It is also an object of the invention to provide a means and method of regulating the maximum air load that can be placed on an elevator surface operated under full power, regardless of the speed of the airplane.

It is still another object of the present invention to provide a means and method of maintaining the sensitivity of elevator response to the pilot's controls substantially uniform at all maneuverable speeds.

As it is highly desirable that a pilot be able to distinguish the condition where the airplane approaches a stalling condition, a synthetic feel can be applied to the control stick for that purpose when full powered controls are used. A stick centering force can be produced by the airstream flowing past the airplane, usually being provided by a device operating by the relationship between ram air pressure and static pressure, or a pressure on the upper wing surface. A device of the latter type, when attached to the elevator of an airplane, provides a stick centering and restoring force which is high at high speeds and low angles of attack but low at high angles of attack approaching a stall, and thus operates as a stall warning indicator to the pilot operating the stick. As the aerodynamic force increases with speed, the increase in stick force also tends to prevent the pilot from overloading the control surfaces.

However, when a synthetic feel or aerodynamic load producing unit is provided and directly connected to the stick in an airplane having a relatively high top speed to landing speed ratio, the applied restoring forces as derived aerodynamically may not be satisfactory at both high and low speed. If, for example, the stick restoring forces at developed low speeds are satisfactory for proper landing maneuvers, the aerodynamic force developed and applied to the stick by the synthetic feel device may be far too high for satisfactory stick movement by the pilot at high speeds.

It is still another object of the present invention to provide a means and method of regulating the value of an aerodynamically produced synthetic feel force applied to a pilot's control element in an airplane, particularly an airplane having a high top speed to landing speed ratio, in order that the stick forces at high speeds be low enough to provide a satisfactory control, but which will be enough at landing speeds to allow a satisfactory landing to be made.

Furthermore, in airplanes employing a device coupled to the stick to provide an aerodynamic feel when moved in elevator controlling directions, it is also customary to additionally provide the stick with a cooperating, fixed type stick centering and neutralizing force producer, such as a centering spring, for example, so that centering forces will still be present on the stick in the absence of aerodynamic forces, as when the airplane is on the ground for example. As the aerodynamic centering device changes its centering forces with variations in speed while the fixed force unit does not, it is another object of the present invention to indirectly apply an aerodynamic restoring force to the stick by automatic regulation of the force applied by a normally fixed restoring force unit so that the restoring forces can be made satisfactory over the entire speed range of the airplane.

In broad terms, the invention comprises changing the motion ratio between the pilot's stick and a fully powered elevator surface operated by signals generated in accordance with movements of the pilot's stick, and changing this ratio in accordance with air speed. It is preferred to change this motion ratio automatically in accordance with air speed, so that a larger stick displacement will be required at high airplane speeds for a given motion of said elevator, than at lower speeds. The shifting of the motion ratio preferably is begun at the minimum maneuver speed of the airplane and shifted on a continuous basis as the speed is increased to the top speed of the airplane. At any given speed, full displacement of the stick produces air loads limited to a value not substantially in excess of the maximum design load factor of the airplane and of the parts involved. As a synthetic load producing unit is used in conjunction with a full powered elevator surface, the invention also includes changing the motion ratio between the stick and the load producing unit to maintain a proper value of stick restoring forces at all speeds.

The invention may be more fully understood by direct reference to the accompanying drawings, wherein:

Figure 1 is a perspective view showing one side of an airplane using pitch control surfaces which are controlled by one preferred embodiment of the system of the present invention.

Figure 2 is a perspective view on a larger scale than Figure 1, showing a preferred mechanism used for moving the control surfaces of Figure 1.

Figure 3 is a schematic diagram showing in detail the parts of an elevator motion ratio changer suitable for use with the mechanism of Figure 2.

Figure 4 is a schematic diagram similar to Figure 3, showing in detail the parts of a preferred form of synthetic force spring motion ratio changer suitable for use in conjunction with the system of Figure 3.

Figure 5 is a sectional view showing the internal construction of a typical two-way stick centralizing spring.

Referring first to Figure 1, which shows one form of airplane control system in which the present invention can be utilized, an all-wing airplane is provided with swept-back wing panels 1 and a central crew section 2, the airplane being driven at high speed, for example, by turbo jet engines (not shown), the jets issuing from trailing edge tail pipe fairings 3. Combined pitch and climb control surfaces (elevons) 4 are provided at the trailing edge of each wing panel, each of these control surfaces being moved by piston type hydraulic motors 5 by movement of hydraulic valves 6 in accordance with the motion of pilot operated control cables 7. As the motor cylinders and valves are attached to the surface and move with it, full power operated control of surfaces 4 is obtained, without transmission of any air loads to the pilot through the cables 7, as more fully described and claimed in my copending application Serial Number 23,567, filed April 27, 1948.

The crew section 2 is provided with a nose 8 in which are located the pilot and co-pilot, together with their respective control sticks 9 and 10 for operation of elevons 4 in aileron and/or elevator directions as may be desired. The linkage for accomplishing these control surface movements is shown in detail in Figure 2.

A torque shaft 11 is provided extending from the pilot's position, and rotatable in shaft bearings 12. Mounted on the front of torque shaft 11 for fore-and-aft motion is a pilot's stick 9, and a co-pilot's stick 10 is similarly mounted on the rear of torque shaft 11.

Substantially midway between the pilot's and co-pilot's sticks, an elevator and aileron combining mechanism 13 is attached by pin 14 to rotate in a fore-and-aft direction. Pin 14 is parallel to the axes of rotation of the sticks so that as either stick is rocked laterally in either direction, the combining mechanism will also be rocked.

The pilot's stick 9 is extended below its axis of rotation as a forked lever 15, while the co-pilot's stick 10 is extended below its axis of rotation by a solid lever 16. The combining mechanism 13 is also extended below its pin 14 as a variable length lever 17.

A pilot's elevator rod 18 extends from the end of forked lever 15 to the end of extensible lever 17, and similarly a co-pilot's elevator rod 19 extends from the solid lever 16 to the end of variable length lever 17, the detailed construction of which will be later described. Thus, by fore-and-aft motion of either stick, the combining mechanism 13 will be rocked in a fore-and-aft direction irrespective of any rotation of torque shaft 11 by the sticks. Similarly, rotation of shaft 11 does not change the fore-and-aft position of either end of the combining mechanism.

On each side of the combining mechanism, is positioned an elevon cable sector 20 mounted to rotate in stationary sector bearings 21 fastened to the airframe to be co-axial with the axis of fore-and-aft rotation of the combining mechanism when the sticks are in neutral position. One elevon cable sector 20a is connected to cables 7a to operate the left-hand elevon, and the other elevon cable sector 20b is connected to similar cables 7b to operate the right-hand elevon.

The upper end of combining mechanism 13 is provided with rearwardly and outwardly extending arms 22 and 23, one of which is connected by link 24a to a rearwardly extending lever 25 connected to the adjacent elevon cable sector 20a, and the other arm 23 is connected to a similar rearwardly extending lever 26 connected to the other elevon sector 20b. Link bearings 27 are all ball joints or similar bearings permitting motion in all directions except in tension or compression of links 24a and 24b.

Rotation of torque shaft 11 will rock the combining mechanism laterally to move the elevon sector on one side in one direction, and the other elevon sector in the opposite direction, thus providing motion of the elevons 4 in opposite directions for roll control. Fore-and-aft movement of the stick rocks the entire combining mechanism in a fore-and-aft plane and thus moves both elevon sectors in the same direction to control the elevons in the same direction for pitch and climb control. Either roll or pitch and climb control thus can take place simultaneously or singly as desired.

As the elevons do not transmit any air loads to the sticks, synthetic centering forces for the sticks are applied thereto, which can be provided by an elevator force spring assembly 30 attached at one end by an elevator bracket 31 to the airframe and at the other end to a force spring lever 32 positioned between the forks of forked lever 15 forming an extension of the pilot's stick, as shown in Figure 2. As the co-pilot's stick 10 operates in unison with the pilot's stick 9, any force applied in elevator direction by the force spring assembly will apply to both sticks.

A similar aileron force spring assembly 33 is attached to the airframe at one end by an aileron bracket 34 and to the torque shaft 11 through a shaft lever 35 extending downwardly from torque shaft 11. This aileron force spring assembly 33 is positioned at a right angle to the elevator force spring assembly 30. Thus, a centering force is applied to the sticks when they are moved in either elevation controlling or roll controlling directions.

The structure of one form of force spring assembly found satisfactory for use in centering both elevation and roll movements of the sticks is shown in Figure 5.

A hollow spring operating rod 36 is attached to the end of the extensible force spring lever 32 or to the end of the shaft lever 35 as the case may be. Spring operating rod 36 is provided with an end shoulder 37 which bears against an internal nut 38 on one end of a tension rod 39. This latter rod passes through one spring cap 40 and then through a second and opposite spring cap 41 to terminate in a second rod nut 42. A spring 43 is placed between spring caps 40 and 41, the latter being movable within a spring casing 44 to which elevator bracket 31 or aileron bracket 34 is attached, as the case may be.

Caps 40 and 41 are held from leaving the casing at one end by casing end 45 and at the other end by split ring 46. Spring operating rod 36 bears against, but is not attached to the first spring cap 40.

When the spring operating rod 36 is moved toward the spring casing 44, it bears against cap 40 to compress the spring 43, as the opposite cap 41 cannot move, and the spring operating rod 36 slides over tension rod 39.

In the reverse direction shoulder 37 picks up internal nut 38 on tension rod 39, moves this rod and the second spring cap 41 to again compress the spring, but from the opposite end. Thus, the neutral point is determined by the length of spring operating rod 36 which is preferably made adjustable by the use of threads 47 thereon rotatable into rod end bearing 48.

The control system so far described provides for the transmission of stick motions to the single pair of elevons in any combination of directions for proper attitude control in roll, and pitch or climb, together with means for centering the sticks in a neutral position.

As pointed out above, it is highly desirable that the motion ratio of stick movement to the motion of the elevator be changeable to provide a greater movement of the elevator at low speeds than is permissible at high speeds. A preferred mechanism for this purpose that is entirely automatic in action throughout the entire maneuverable speed range is shown in Figure 3. This view is diagrammatic and not to scale in order to illustrate the basic principles of the device more clearly.

It will be noted that when other linkages remain the same, that a change in length of variable length lever 17 will change the motion ratio between stick movement, and the movement of the two cable sectors 20. As the cable sectors are connected to move valves 6 in the hydraulic motors, the ratio of control surface movement and stick movement will likewise be changed.

In order that the length of variable length lever 17 be changed as desired, a gear train assembly 50 is attached to the combining mechanism below the torque shaft 11, this gear train rotating a nut assembly 51 into which a screw 52 is fitted, the other end thereof being attached to the pilot's and co-pilot's elevator rods 18 and 19, respectively, by fitting 53.

Gear train 50 is driven by a reversible motor 54 preferably of the D. C. type provided with reversing windings 55. Rotation of the motor in one direction will shorten variable length lever 17 and rotation in the other direction will lengthen this lever to change the motion ratio between the stick and the elevon sectors 20. The gear train 50 is also preferably provided with a flexible override shaft 56 whereby the length of lever 17 can be changed manually by pilot and co-pilot. The variable length lever is preferably adjusted so that alinement of the elevator rods takes place midway between the extreme short length and the extreme long length of the variable length lever so that the effective length of the elevator rods will not be changed excessively. The only effect of changing the length of the lever 17 would be to change the positions of the elevon sectors very slightly, but it has been found that this effect is negligible in the operation of the airplane control surfaces, as the elevator rods 18 and 19 are of relatively long radius (4 to 5 feet in a large airplane) and are preferably equal in length. In practice, sufficient play in the various joints will usually exist to prevent hydraulic motor valve displacement when the length of lever 17 is changed.

While the effectiveness of the control surfaces and the action thereof on the airplane varies in different designs, it has been found practical to vary the ratio of stick movement to elevator movement to provide at least twice the swing of the control surfaces at landing speeds than that provided at high speed, and to keep the air loads on the order of the maximum design load factor at any speed between and including landing speed and top speed.

While it is possible, and indeed perfectly practical to change the motion ratio manually by manual operation of motor 54 or override shaft 56, it is preferred to change the ratio automatically in accordance with airplane speed. Such a system is also shown in Figure 3.

A preferred air speed indicating unit comprises a housing 60 containing a diaphragm 61 having flexible edges 62 secured to the housing to substantially bisect the housing. A housing rod 63 passes diametrically through the housing and is attached at one end outside the housing to a piston rod 63a, the head 64 of which bears against an air speed load spring 65 in a load spring casing 66. Load spring casing 66 is attached to the airframe by load bracket 67. To provide the aerodynamic forces acting on the diaphragm, the pressure chamber 68, nearest the load spring, is connected to ram air by ram air pipe 69. The static chamber 70 in the housing 60 is connected by static air pipe 71 to a region in the airplane where static pressure exists. By regulation of diaphragm size and load spring pressure the housing rod 63 will be moved in accordance with air speed.

The other end 63b of the housing rod 63 carries a potentiometer speed contact 72 insulated from the housing rod 63 by insulating block 73 and is connected to a speed contact wire 74. An additional potentiometer speed contact 72a is also mounted on rod end 63b and is used in the operation of the device of Figure 4, to be later described. Potentiometer speed contact 72 is positioned to be moved over a speed potentiometer winding 75 having one end thereof grounded. The other end of the speed potentiometer winding 75 is connected by power wire 76 to the ungrounded side of a power source 77, such as a battery, and also by paralleling power wire 76x to one end of a lever potentiometer winding 78 attached to gear train 50. A lever contact 79 is movable over lever potentiometer winding 78 and is supported on the fitting 53 of the variable length lever 17 by an insulator 80. Lever contact 79 is connected to a lever contact wire 81. Thus, the position of lever contact 79 on lever potentiometer winding 78 will be in accordance with the length of lever 17. Speed contact wire 74 and lever contact wire 81 are connected to opposite ends of a relay winding 82 on a polarized relay 83 having its movable arm 84 connected to the ungrounded side of battery 77. Opposite arm contacts 85 and 86 on relay 83 are respectively connected to the reversing windings 55 and then to one brush 87 of the motor 54, the other brush 88 being grounded.

In steady state operation, the outputs of the two potentiometers 75 and 78 will be balanced and the arm 84 of the polarized relay 83 will not close either contact. If, however, the air speed changes, the output of the air speed potentiometer 75 will be different from that of the lever potentiometer 78 and the arm 84 will make contact with one or the other contacts 85 or 86, thus causing the motor 54 to run in the direction desired to lengthen or shorten lever 17. As the lever 17 is changed in length, the output of the lever potentiometer will come to match the output of the air speed potentiometer, and motor 54 will stop. Thus, the lever will assume various lengths in accordance with air speed and the motion ratio between stick and elevons will vary in accordance with air speed. When connected in the proper sense the elevons will swing farther for a given stick movement at low speeds than at high speeds. The ratio change is completely automatic. In order to be able to change the motion ratio in case the electrical supply fails, the flexible override shaft 56 (shown in Figure 3) is preferably connected to a pilot's override wheel and a co-pilot's override wheel (not shown) at the respective pilot's and co-pilot's positions. In accordance with the airplane design, the maximum elevon swing in elevator directions can be maintained to limit maximum air loads to values on the order of the design load factors at all speeds.

As stated above, airplanes having a full powered elevator surface have synthetic aerodynamic "feel" applied to the surface, as this feel will operate as an effective stall warning for the pilot.

In the copending application of Ashkenas, Serial Number 567,683, filed December 11, 1944, a device responding to dynamic air flow past an airplane is shown, described and claimed, being directly connected to the control column to provide a synthetic elevator "feel" when the elevators are moved by a servo motor operated by control column movement. The presently described air speed indicating mechanism is similar, but indirectly controls a force applied to the control stick in such a manner that the restoring forces applied to the stick can be changed in accordance with air speed, but with the relation to air speed under full control.

As the air speed indicating mechanism can exert little or no neutralizing force on a control column or stick at low speeds, or when on the ground, elevator force spring assembly 30 is utilized to center the stick at all times. If the centralizing force exerted by this elevator force spring assembly on the control stick when moved in elevation directions is changed in accordance with air speed, then the pilot will be provided with a synthetic "feel," even though the air speed indicating mechanism is not directly connected to the control column. As the air speed indicating mechanism is already present as a part of the motion ratio changing system between stick and the control surface, the force of elevator spring assembly 30 is changed in accordance with air speed, as shown in Figure 4.

In this figure, the air speed indicating system is the same as that shown in Figure 3 and the parts have been given the same numbers. In a like manner, the electrical circuit although separate is the same and has been given the same numbers with an "a" suffix. The only difference is that the gear train 50a in this case is attached to the pilot's stick 9 below the torque shaft 11 with the end of screw 52a forming the end of the variable length force spring lever 32 which is connected to the operating rod 36 of the elevator force spring assembly 30. By lengthening or shortening the extent of the elevator force spring lever 32 in accordance with air speed, in a manner similar to the action of the circuit shown in Figure 3, the ratio of stick motion to stick load can be changed in accordance with air speed, but because of the indirect linkage, the restoring forces applied to the stick can be made satisfactory at both high and low speeds where the ratio of top speed to low speed is relatively high.

For example, if the restoring force provided by force spring 30 is made to be satisfactory at low speeds, and the restoring force is increased as the square of airspeed, as occurs in the load transmitting members of a device responsive to dynamic air flow and connected directly to a pilot's control stick or column, the restoring forces at top speed might well be far too high for proper airplane control by the pilot. Conversely, if the restoring force is set to be satisfactory at top speed, and this force is decreased directly as the square of air speed, then it may be that no restoring force at all is available at landing speed. Therefore, the reversing windings 55a are connected in the proper sense so that lever 32 will be lengthened with an increase in airspeed, but the lengthening is regulated so that the resulting increase in stick force at any one position is not as great as would occur if a bellows rod were connected to act directly and unrestrained on a control stick lever.

In the present device the desired low speed force and the top speed force can readily be set up by proper distribution of resistance values in potentiometers 75a and 78a. The aerodynamic forces will then cause a change in the length of the lever 32 to vary the restoring forces between the two limits in accordance with air speed and with any desired relation thereto. Such an arrangement permits the stick forces at high speeds to be low enough to provide a satisfactory control, and still allows the stick forces also to be sufficient at landing speed to permit a satisfactory landing to be made.

Thus, a single air speed measuring device can be used to limit power operation of the elevators to safe air loads at all speeds, and at the same time to regulate the synthetic stick centering forces to satisfactory piloting values over a wide speed range.

As the present invention is applicable to control systems using automatic pilot devices, the term pilot as used herein is deemed to include automatic piloting devices as well as human pilots.

While a specific embodiment of my invention has been described in detail, it is to be understood that the invention is not limited to the details disclosed.

What is claimed is:

1. In a full powered airplane control system, a pilot's control element, an elevator surface, means for moving said elevator surface under power controlled by movements of said control element, airspeed measuring means, a variable-length moment arm connected to be rotated by said control element, a two-way force spring assembly having one end pivotally connected substantially at a right angle to said moment arm at an end point thereof and the opposite end of said force spring assembly pivotally secured to the structure of the airplane, and means for changing the length of said moment arm in accordance with a condition of said airspeed measuring means.

2. In a full powered airplane control system, a pilot's control element, a control surface, means for moving said control surface under power controlled by movements of said control element, a moment arm connected to be rotated about an axis by said control element, actuator means connected in said moment arm to move the outer end of said moment arm in radial directions with respect to said axis, a rod member pivotally connected to said outer end substantially at a right angle to said radial directions, elastic control element centering means connected in line between said rod member and the structure of the airplane, airspeed measuring means, and means for operating said actuator means to change the distance of said outer end from said axis in accordance with the condition of said airspeed measuring means.

3. In a full powered airplane control system, a pilot's control element, a control surface, means for moving said control surface under power controlled by movements of said control element, airspeed measuring means including a movable member having positions corresponding to airspeed, a variable-length moment arm connected to be rotated by said control element, elastic force producing means connected to center said control element through said moment arm, a reversible electric motor connected to change the length of said moment arm, a pair of electrical potentiometers connected as legs in a bridge circuit across a source of D. C. voltage, a potentiometer pick-off fixed to said movable member and arranged to move in electrical contact along one of said potentiometers, a second potentiometer pick-off fixed to an extensible part of said moment arm and arranged to move in electrical contact along the other potentiometer, polarity-sensitive relay actuating means wired at opposite ends to each respective pick-off, and relay switch means operable in two directions to energize said motor in two directions, said relay switch means being operatively associated with said polarity-sensitive actuating means to be moved thereby in either of said two directions in accordance with the direction of current through said actuating means, said potentiometers having a predetermined resistance arrangement to regulate the lengthening of said moment arm in a desired relation to airspeed increase, and vice versa.

THOMAS A. FEENEY.

References Cited in the file of this patent

UNITED STATES PATENTS

| Number | Name | Date |
|---|---|---|
| 2,205,610 | Van Ness | June 25, 1940 |
| 2,295,159 | Child | Sept. 8, 1942 |
| 2,445,343 | Tyra | June 20, 1948 |
| 2,475,217 | Bernas | July 5, 1949 |
| 2,508,162 | Herwald | May 16, 1950 |
| 2,508,883 | Knowler et al. | May 23, 1950 |

FOREIGN PATENTS

| Number | Country | Date |
|---|---|---|
| 569,290 | Great Britain | May 16, 1945 |